(12) United States Patent
He et al.

(10) Patent No.: US 12,127,176 B2
(45) Date of Patent: Oct. 22, 2024

(54) UPLINK TRANSMISSION SUPPORT FOR REDUCED CAPABILITY DEVICES IN WIRELESS COMMUNICATIONS

(71) Applicant: Apple Inc., Cupertino, CA (US)

(72) Inventors: Hong He, Cupertino, CA (US); Chunxuan Ye, San Diego, CA (US); Dawei Zhang, Saratoga, CA (US); Haitong Sun, Irvine, CA (US); Jie Cui, San Jose, CA (US); Seyed Ali Akbar Fakoorian, San Diego, CA (US); Wei Zeng, San Diego, CA (US); Weidong Yang, San Diego, CA (US); Yushu Zhang, Beijing (CN); Chunhai Yao, Beijing (CN)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 17/441,908

(22) PCT Filed: Apr. 27, 2021

(86) PCT No.: PCT/CN2021/090324
§ 371 (c)(1),
(2) Date: Sep. 22, 2021

(87) PCT Pub. No.: WO2022/226802
PCT Pub. Date: Nov. 3, 2022

(65) Prior Publication Data
US 2023/0269712 A1    Aug. 24, 2023

(51) Int. Cl.
*H04W 72/0453* (2023.01)
*H04B 1/7136* (2011.01)

(52) U.S. Cl.
CPC ...... *H04W 72/0453* (2013.01); *H04B 1/7136* (2013.01)

(58) Field of Classification Search
None
See application file for complete search history.

(56) References Cited

U.S. PATENT DOCUMENTS 7,123,586 B1 * 10/2006 Cook .................... H04L 47/765
370/468
2008/0318527 A1 * 12/2008 Higuchi ................. H04L 5/003
455/42

(Continued)

FOREIGN PATENT DOCUMENTS

CN    103634917 A    3/2014

OTHER PUBLICATIONS

Interdigital, Inc. "Reduced maximum bandwidth for RedCap UEs", SGPP TSG RAN WG1 #104b-3 R1-2103421; | | 5 pages; Dec. 4, 2021. (Year: 2021).*

(Continued)

*Primary Examiner* — Faiyazkhan Ghafoerkhan
(74) *Attorney, Agent, or Firm* — Kowert, Hood, Munyon, Rankin & Goetzel, P.C.

(57) ABSTRACT

A reduced capacity (redcap) device may perform initial uplink communications, including transmitting a redcap physical uplink control channel (R-PUCCH), over an initial uplink bandwidth part (BWP) shared with a second device, the initial uplink BWP having a bandwidth (BW) larger than a maximum BW supported by the redcap device and smaller than or equal to a maximum BW supported by the second device. Frequency hopping operation for the redcap device may be supported for the R-PUCCH transmission through frequency division multiplexing and/or time division multiplexing settings for the resources used for the R-PUCCH transmission, and for PUCCH transmission by the second device. Restrictions may be implemented to create a gap for redcap devices to perform RF retuning between a physical RACH transmission and a subsequent physical control chan- (Continued)

nel (e.g. PDCCH) monitoring for random access reception when the frequency gap is larger than the maximum BW supported by the redcap device.

20 Claims, 13 Drawing Sheets

(56) References Cited

U.S. PATENT DOCUMENTS

| | | | | |
|---|---|---|---|---|
| 2011/0085457 | A1* | 4/2011 | Chen | H04L 5/0053 370/252 |
| 2022/0210806 | A1* | 6/2022 | Rastegardoost | H04L 5/0051 |
| 2022/0338265 | A1* | 10/2022 | Lei | H04W 72/044 |
| 2022/0377798 | A1* | 11/2022 | Chien | H04W 74/0833 |
| 2022/0418001 | A1* | 12/2022 | Chien | H04W 76/18 |
| 2023/0038936 | A1* | 2/2023 | Zheng | H04L 1/1854 |
| 2023/0269712 | A1* | 8/2023 | He | H04W 72/51 370/329 |
| 2023/0284222 | A1* | 9/2023 | Sun | H04L 1/0067 370/329 |

OTHER PUBLICATIONS

International Search Report and Written Opinion for PCT Patent Application No. PCT/CN2021/090324; 9 pages; Jan. 19, 2022.
Extended European Search Report for EP 21878754.7; 11 pages; Sep. 27, 2022.
Interdigital, Inc. "Reduced maximum bandwidth for RedCap UEs"; 3GPP TSG RAN WG1 #104b-3 R1-2103421; 5 pages; Apr. 12, 2021.
Apple Inc. "On reduced maximum UE bandwidth for Redcap"; 3GPP TSG-RAN WG1 #104bis-e R1-2103112; 5 pages; Apr. 12, 2021.
ERICSSON "Reduced maximum UE bandwidth for Redcap"; 3GPP TSG-TAN WG1 Meeting #104-bis-e tdoc R1-2102722; 17 pages; Apr. 12, 2021.

* cited by examiner

UPLINK TRANSMISSION SUPPORT FOR REDUCED CAPABILITY DEVICES IN WIRELESS COMMUNICATIONS

PRIORITY CLAIM INFORMATION

This application is a U.S. National Stage application of International Application No. PCT/CN2021/090324, filed Apr. 27, 2021, titled "Uplink Transmission Support for Reduced Capability Devices in Wireless Communications", which is hereby incorporated by reference in its entirety as though fully and completely set forth herein.

FIELD OF THE INVENTION

The present application relates to wireless communications, including providing uplink support for reduced capability devices in wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc. A current telecommunications standard moving beyond the current International Mobile Telecommunications-Advanced (IMT-Advanced) Standards is called 5th generation mobile networks or 5th generation wireless systems, referred to as 3GPP NR (otherwise known as 5G-NR or NR-5G for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

One aspect of wireless communication systems, including NR cellular wireless communications, involves scheduling communications for devices having different respective capabilities. Improvements in the field are desired.

SUMMARY OF THE INVENTION

Embodiments are presented herein of, inter alia, of methods and procedures for various reduced capacity and non-reduced capacity wireless communication devices to effectively communicate using the same initial uplink and downlink bandwidth part (BWP), with specific frequency hopping and random access procedure support for reduced capacity devices. Embodiments are further presented herein for wireless communication systems containing wireless communication devices or user equipment devices (UEs) and/or base stations and access points (APs) communicating with each other within the wireless communication systems.

Pursuant to the above, a device, for example a reduced capacity device, may perform initial wireless uplink communications over an initial uplink bandwidth part (BWP) shared with a second device, with the initial uplink BWP having a bandwidth (BW) that is larger than a maximum BW supported by the device and is smaller than or equal to a maximum BW supported by the second device. In some embodiments, the device may perform the initial wireless uplink communications using specific frequency resources within the initial uplink BWP and within the maximum BW supported by the device. The frequency resources may be based on a separate physical resource block (PRB) offset relative to a first PRB of the initial uplink BWP. The separate PRB offset may be used to determine the resources for frequency hopping.

The device may determine a first PRB index and a second PRB index based at least in part on the separate PRB offset, with the first PRB index is for a physical uplink control channel (PUCCH) transmission of the initial wireless uplink communications in a first frequency hop, and the second PRB index is for the PUCCH transmission in a second frequency hop. The first PRB index and the second PRB index may be further based on a total number of initial cyclic shift indexes and a PUCCH resource index. The value of a PRB offset parameter representative of the separate PRB offset may be explicitly configured in a PUCCH common resource information element (IE) of a system information block (SIB).

In some embodiments, the device may perform a PUCCH transmission using specific resources that are time-division multiplexed with PUCCH resources used by the second device within the initial uplink BWP. The time-division multiplexed PUCCH resources may be exclusively reserved for the PUCCH transmission of the device within the initial uplink BWP, or at least a first portion of the specific resources may be shared with the second device during a first frequency hop and a second portion of the specific resources may be reserved for use by the device during a second frequency hop. The length of the PUCCH transmission may be defined in terms of the number of PUCCH orthogonal frequency division multiplexed (OFDM) symbols transmitted during the PUCCH transmission. The number may be indicated to the device via an IE in a SIB), or via an index to a row of hard-encoded table that includes a set of predefined OFDM symbols corresponding to a respective PUCCH format for the PUCCH transmission. A first portion of the PUCCH OFDM symbols may be transmitted during a first frequency hop and a remaining portion of the PUCCH OFDM symbols may be transmitted during a second frequency hop. The first portion of the PUCCH OFDM symbols may be located in a first slot and the second portion of the PUCCH OFDM symbols may be located in a second slot, with a gap between the last PUCCH OFDM symbol in the first slot and the first PUCCH OFDM symbol in the second slot greater than the switching gap. The value of the start symbol in the first frequency hop may be signaled to the device in a SIB, or it may be implicitly determined based at least in part on the length of the PUCCH transmitted by the device and the value of a start symbol broadcasted by a SIB for a PUCCH transmission of the second device in the initial uplink BWP.

The start symbol for the first hop and the start symbol for the second hop may be different from each other for the PUCCH transmission by the device. In some embodiments, the specific resources may be shared between the device and the second device for respective transmissions of the PUCCH by the device and another PUCCH by the second device. The specific resources may be split between PUCCH resources for the device and PUCCH resources for the second device by using different respective PUCCH resource indicator (PRI) values for first device and the second device. The PRI values for the device may be smaller than or equal to a first value and may limit the PUCCH resources to be within consecutive physical resource blocks (PRBs) at one edge of the initial uplink BWP, while the PRI values for the second device may be larger than the first value and may map PUCCHs resources for the second device to be within PRB sets at the other edge of the initial uplink BWP. The specific resources for the device may be mapped to resource blocks (RBs) that do not overlap in the frequency domain with RBs of resources used by the second device to perform its own PUCCH transmission in the initial uplink BWP. The specific resources for the device may be interlaced within a slot such that time-domain segmentations caused by radio frequency tuning are eliminated.

In some embodiments, the device may perform the PUCCH transmission via at least a first frequency hop and a second frequency hop, with certain symbols of the first frequency hop and certain symbols of the second frequency hop punctured to create a switching gap of a specified length between the first frequency hop and the second frequency hop. In some embodiments, the specific resources may be included in a single slot that also includes time-division multiplexed resources for initial uplink transmissions performed by the second device.

In some embodiments, frequency hopping for the device may be disabled, while in some embodiments, a set of initial uplink BWPs specific to redcap devices may be configured in a SIB, where the respective BWs of the BWPs of the set of initial uplink BWPs are no greater than the maximum BW supported by redcap devices. Alternately, a number of different frequency offsets may be configured in a SIB to create a set of respective redcap-specific initial uplink BWPs, based on the maximum BW supported by the device and the different frequency offsets.

In some embodiments, a random access response (RAR) window, for the device monitoring a physical downlink control channel (PDCCH) subsequent to a random access procedure for a corresponding RAR, may configured to start at a first symbol of an earliest control resource set on which the device is set to receive the PDCCH. The earliest control resource set may be located at least a specified number of symbols after the last symbol of an associated physical random access channel (PRACH) occasion. The value of the specified number may be either hard-encoded, or reported by the device via a UE capability report by selecting one from a set of values configured via RRC signaling. The value of the specified number may also be determined to create a gap that is required to perform an RF retuning operation for the device when the gap between a central frequency of the PRACH occasion and a central frequency of an associated CORESET is larger than the maximum BW supported by the device.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
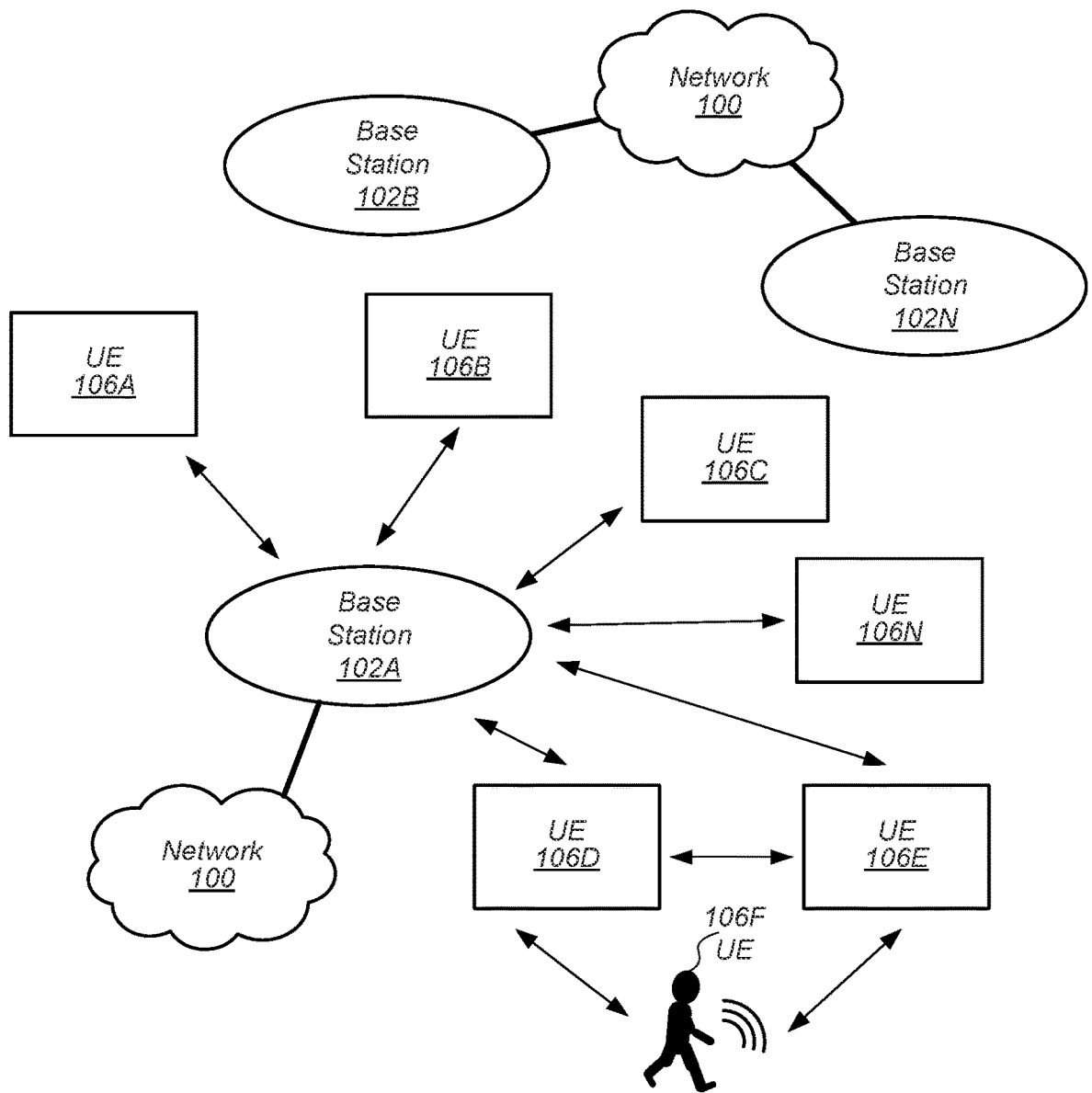
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AF: Application Function
AMF: Access and Mobility Management Function
AMR: Adaptive Multi-Rate
AP: Access Point
APN: Access Point Name
APR: Applications Processor
BS: Base Station
BSSID: Basic Service Set Identifier
CBRS: Citizens Broadband Radio Service
CBSD: Citizens Broadband Radio Service Device
CCA: Clear Channel Assessment
CCE: Control Channel Elements
CMR: Change Mode Request
CS: Cyclic Shift
CORESET: Control Resource Set
DL: Downlink (from BS to UE)
DMRS: Demodulation Reference Signal
DN: Data Network
DSDS: Dual SIM Dual Standby
DYN: Dynamic
EDCF: Enhanced Distributed Coordination Function
eSNPN: Equivalent Standalone Non-Public Network
FDD: Frequency Division Duplexing
FT: Frame Type
GAA: General Authorized Access
GPRS: General Packet Radio Service
GSM: Global System for Mobile Communication
GTP: GPRS Tunneling Protocol
HPLMN: Home Public Land Mobile Network
IC: In Coverage
IMS: Internet Protocol Multimedia Subsystem
IOT: Internet of Things
IP: Internet Protocol
LAN: Local Area Network
LBT: Listen Before Talk
LQM: Link Quality Metric
LTE: Long Term Evolution
MCC: Mobile Country Code
MNO: Mobile Network Operator
MO: Monitoring Occasion
NAS: Non-Access Stratum
NF: Network Function
NG-RAN: Next Generation Radio Access Network
NID: Network Identifier
NMF: Network Identifier Management Function
NPN: Non-Public (cellular) Network
NRF: Network Repository Function
NSI: Network Slice Instance
NSSAI: Network Slice Selection Assistance Information
OFDM: Orthogonal Frequency Division Multiplexing
OOC: Out Of Coverage
PAL: Priority Access Licensee
PBCH: Physical Broadcast Channel
PDCP: Packet Data Convergence Protocol
PDN: Packet Data Network
PDU: Protocol Data Unit
PGW: PDN Gateway
PLMN: Public Land Mobile Network
PRACH: Physical Random Access Channel
PRB: Physical Resource Block
PRI: Physical Uplink Control Channel (PUCCH) Resource Indicator
PSCCH: Physical Sidelink Control Channel
PSFCH: Physical Sidelink Feedback Channel
PSSCH: Physical Sidelink Shared Channel
PSD: Power Spectral Density
PSS: Primary Synchronization Signal
PT: Payload Type
PTRS: Phase Tracking Reference Signal
PUCCH: Physical Uplink Control Channel
QBSS: Quality of Service Enhanced Basic Service Set
QI: Quality Indicator
RA: Registration Accept
RAR: Random Access Response
RAT: Radio Access Technology
RF: Radio Frequency
ROHC: Robust Header Compression
RR: Registration Request
RRC: Radio Resource Control
RSRP: Reference Signal Receive Power
RTP: Real-time Transport Protocol
RX: Reception/Receive
SAS: Spectrum Allocation Server
SD: Slice Descriptor
SI: System Information
SIB: System Information Block
SID: System Identification Number
SIM: Subscriber Identity Module
SGW: Serving Gateway
SMF: Session Management Function
SNPN: Standalone Non-Public Network
SPS: Semi-Persistent Scheduling
SSB: Synchronization Signal Block
SSS: Secondary Synchronization Signal
SUPI: Subscription Permanent Identifier
TBS: Transport Block Size
TCP: Transmission Control Protocol
TDD: Time Division Duplexing
TDRA: Time Domain Resource Allocation
TPC: Transmit Power Control
TX: Transmission/Transmit
UAC: Unified Access Control
UDM: Unified Data Management
UDR: User Data Repository
UE: User Equipment
UI: User Input
UL: Uplink (from UE to BS)
UMTS: Universal Mobile Telecommunication System
UPF: User Plane Function
URM: Universal Resources Management
URSP: UE Route Selection Policy
USIM: User Subscriber Identity Module
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™ Microsoft XBox™, etc.), portable gaming devices (e.g., Nintendo DS™, PlayStation Portable™, Gameboy Advance™, iPod™), laptops, wearable devices (e.g. Apple Watch™ Google Glass™), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. 5G NR, LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Bandwidth Part (BWP)—A bandwidth part (BWP) is a contiguous set of physical resource blocks selected from a contiguous subset of the common resource blocks for a given numerology on a given carrier. For downlink, a UE may be configured with up to a specified number of carrier BWPs (e.g. four BWPs, per some specifications), with one BWP per carrier active at a given time (per some specifications). For uplink, the UE may similarly be configured with up to several (e.g. four) carrier BWPs, with one BWP per carrier active at a given time (per some specifications). If a UE is configured with a supplementary uplink, then the UE may be additionally configured with up to the specified number (e.g. four) carrier BWPs in the supplementary uplink, with one carrier BWP active at a given time (per some specifications).

Multi-cell Arrangements—A Master node is defined as a node (radio access node) that provides control plane connection to the core network in case of multi radio dual connectivity (MR-DC). A master node may be a master eNB (3GPP LTE) or a master gNB (3GPP NR), for example. A secondary node is defined as a radio access node with no control plane connection to the core network, providing additional resources to the UE in case of MR-DC. A Master Cell group (MCG) is defined as a group of serving cells associated with the Master Node, including the primary cell (PCell) and optionally one or more secondary cells (SCell). A Secondary Cell group (SCG) is defined as a group of serving cells associated with the Secondary Node, including a special cell, namely a primary cell of the SCG (PSCell), and optionally including one or more SCells. A UE may typically apply radio link monitoring to the PCell. If the UE is configured with an SCG then the UE may also apply radio link monitoring to the PSCell. Radio link monitoring is generally applied to the active BWPs and the UE is not required to monitor inactive BWPs. The PCell is used to initiate initial access, and the UE may communicate with the PCell and the SCell via Carrier Aggregation (CA). Currently Amended capability means a UE may receive and/or transmit to and/or from multiple cells. The UE initially connects to the PCell, and one or more SCells may be configured for the UE once the UE is in a connected state.

Core Network (CN)—Core network is defined as a part of a 3GPP system which is independent of the connection technology (e.g. the Radio Access Technology, RAT) of the UEs. The UEs may connect to the core network via a radio access network, RAN, which may be RAT-specific.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
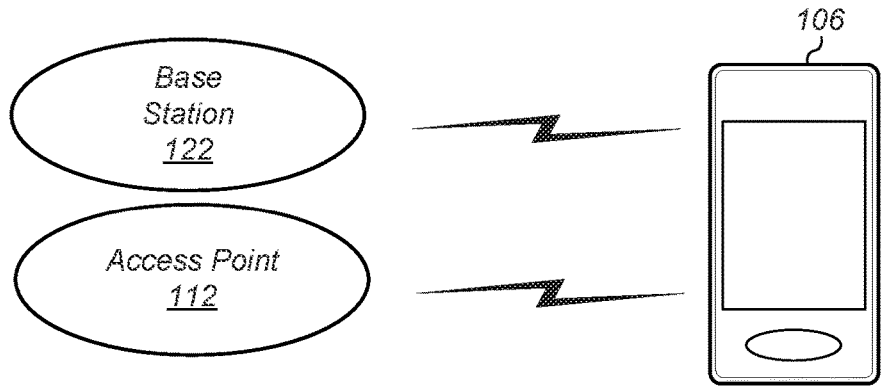
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, neutral host or various CBRS (Citizens Broadband Radio Service) deployments, among various possibilities). Thus, the base station 102A may facilitate communication between the user devices 106 and/or between the user devices 106 and the network 100. In particular, the cellular base station 102A may provide UEs 106 with various telecommunication capabilities, such as voice, short message service (SMS) and/or data services. The communication area (or coverage area) of the base station 106 may be referred to as a "cell." It is noted that "cell" may also refer to a logical identity for a given wireless communication coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Similarly, if the base station 102A is implemented in the context of 5G NR, it may alternately be referred to as 'gNodeB' or 'gNB'. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to private networks. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices 106 and/or between the user devices 106 and the network 100. In particular, the cellular base station 102A may provide UEs 106 with various telecommunication capabilities, such as voice, SMS and/or data services. UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations (such as base stations 102B . . . 102N) operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102A may act as a "serving cell" for UEs 106A-106N as illustrated in FIG. 1, each one of UE(s) 106 may also be capable of receiving signals from (and may possibly be within communication range of) one or more other cells (possibly provided by base stations 102B-102N and/or any other base stations), which may be referred to as "neighboring cells". Such cells may also be capable of facilitating communication in-between user devices 106 and/or between user devices 106 and the network 100. Such cells may include "macro" cells, "micro" cells, "pico" cells, and/or cells which provide any of various other granularities of service area size. For example, base stations 102A-102B illustrated in FIG. 1 may be macro cells, while base station 102N may be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting in a similar manner with the vehicles represented by UEs 106D and 106E. Various embodiments of vehicles communicating in a network exemplified in FIG. 1 are disclosed, for example, in the context of vehicle-to-everything (V2X) communications such as the communications specified by certain versions of the 3GPP standard, among others.

FIG. 2 illustrates an exemplary user equipment 106 (e.g., one of UEs 106A through 106N) in communication with the base station 122 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either of LTE or CDMA2000 1×RTT or NR, and separate radios for communicating using each of Wi-Fi and BLUETOOTH™. Other configurations are also possible.

Figure 3:
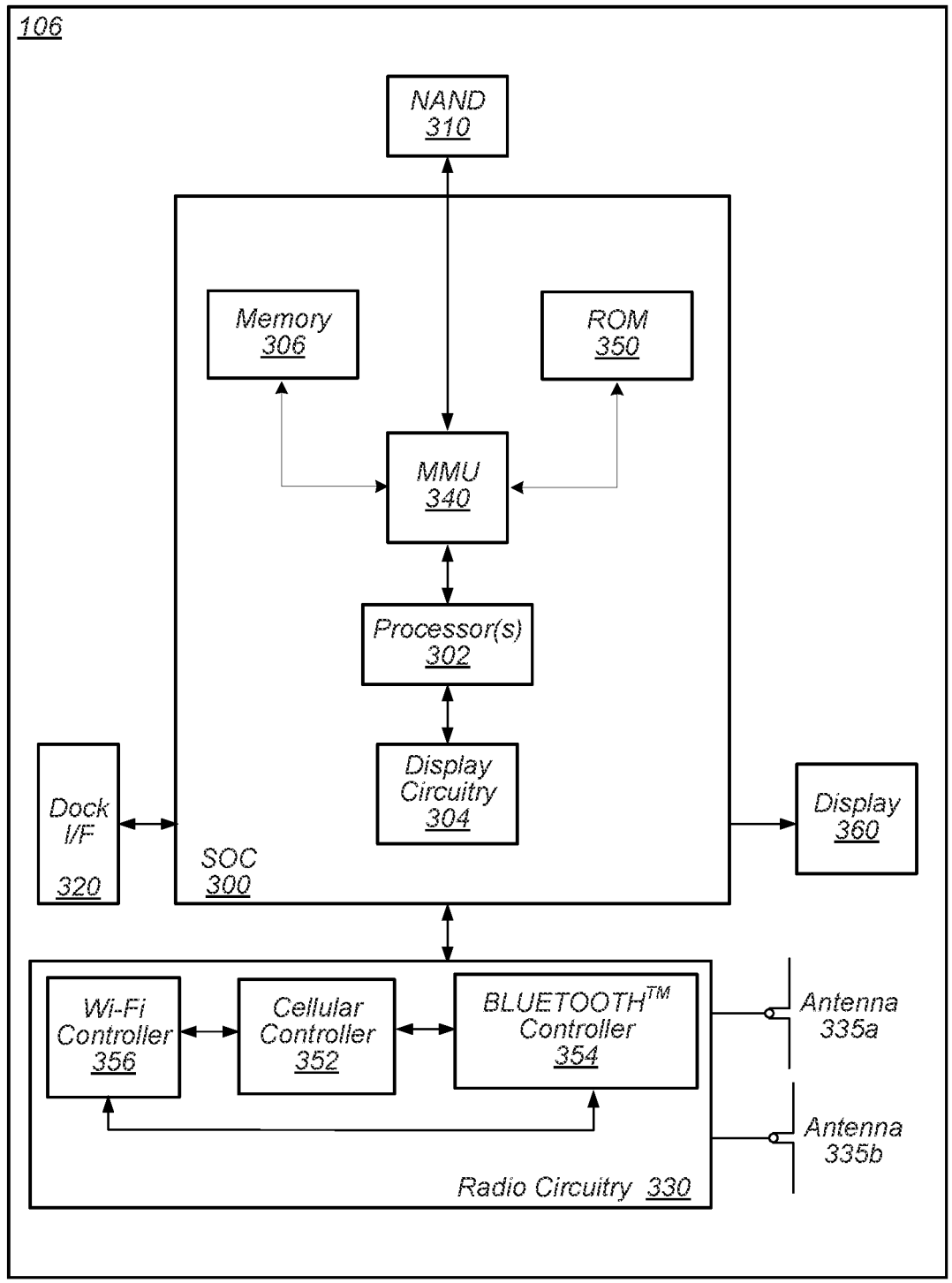
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include various elements/components for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 according to various embodiments disclosed herein. Specifically, processor(s) 302 may be coupled to and/or may interoperate with other components as shown in FIG. 3 to facilitate UE 106 communicating in a manner that seeks to optimize RAT selection. Processor(s) 302 may also implement various other applications and/or end-user applications running on UE 106.

Figure 5:
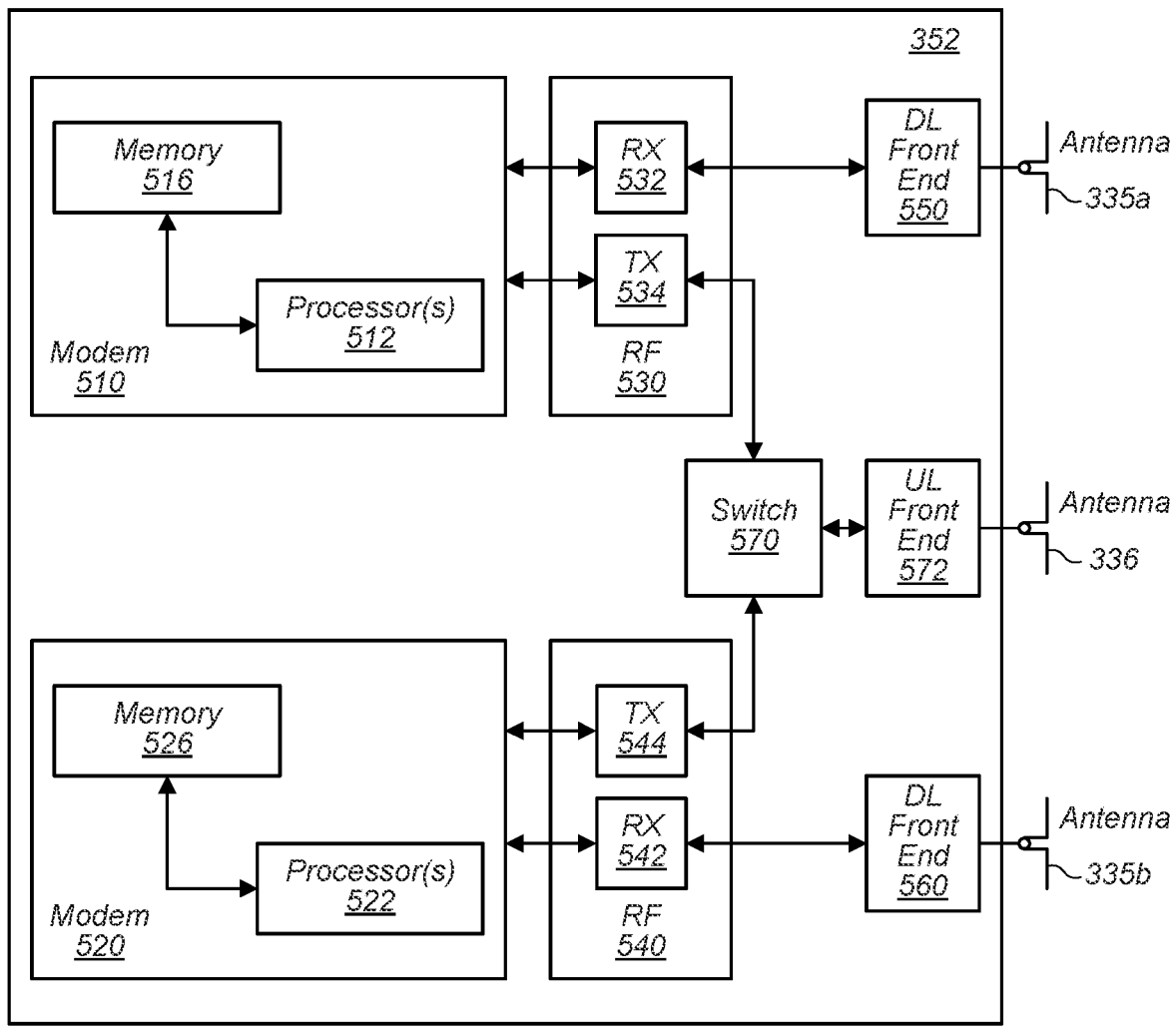
FIG. 5 shows an exemplary simplified block diagram illustrative of cellular communication circuitry, according to some embodiments.

In some embodiments, radio circuitry 330 may include separate controllers dedicated to controlling communications for various respective RATs and/or RAT standards. For example, as shown in FIG. 3, radio circuitry 330 may include a Wi-Fi controller 356, a cellular controller (e.g. LTE and/or NR controller) 352, and BLUETOOTH controller 354, and according to at least some embodiments, one or more or all of these controllers may be implemented as respective integrated circuits (ICs or chips, for short) in communication with each other and with SOC 300 (e.g. with processor(s) 302). For example, Wi-Fi controller 356 may communicate with cellular controller 352 over a cell-ISM link or WCI interface, and/or BLUETOOTH controller 354 may communicate with cellular controller 352 over a cell-ISM link, etc. While three separate controllers are illustrated within radio circuitry 330, other embodiments may have fewer or more similar controllers for various different RATs and/or RAT standards that may be implemented in UE device 106. For example, at least one exemplary block diagram illustrative of some embodiments of cellular controller 352 is shown in FIG. 5 and will be further described below.

Figure 4:
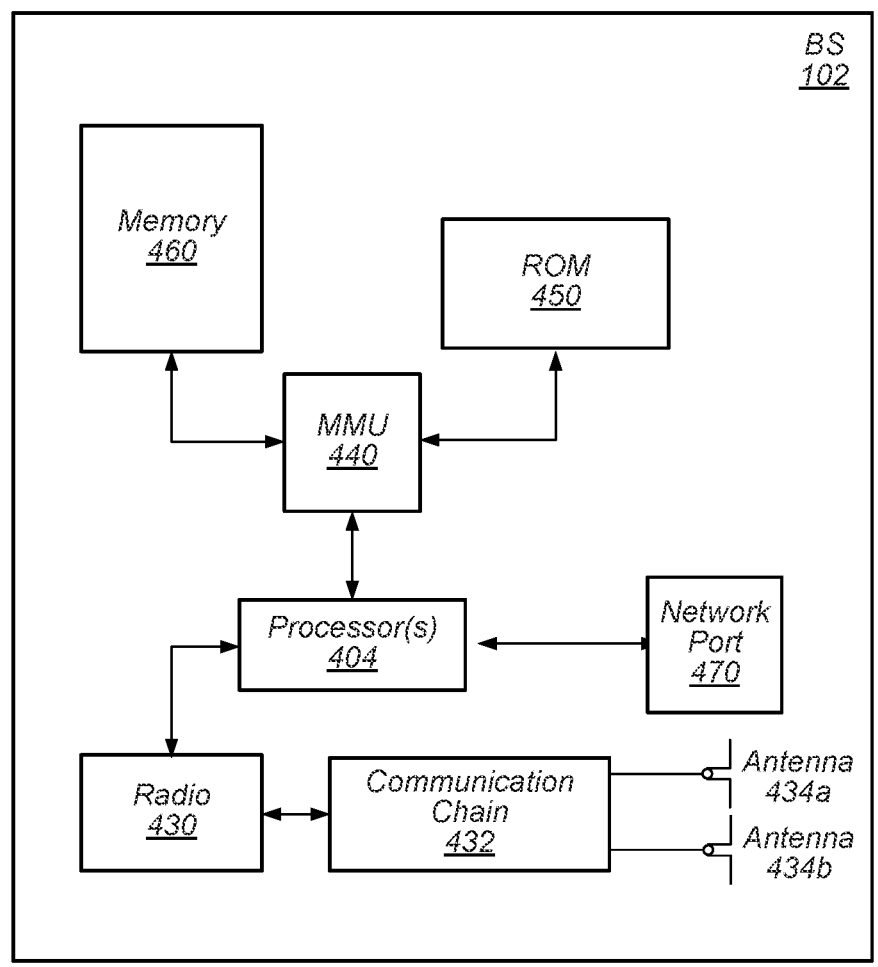
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna 434 or antenna(s) 434. Antenna(s) 434 may be configured to operate as a wireless transceiver and may be further configured to communicate with UE devices 106 via radio circuitry 430. The antenna(s) 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR) WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device as disclosed herein. Alternatively, the processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335*a-b* and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more components. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335*b*. As another example, the cellular communication circuitry 352 may not include the modem 510, the RF front end 530, the DL front end 550, and/or the antenna 335*a*. In some embodiments, the cellular communication circuitry 352 may also not include the switch 570, and the RF front end 530 or the RF front end 540 may be in communication, e.g., directly, with the UL front end 572.

Support for Reduced Capacity Devices

Support for reduced capability NR devices, e.g. devices featuring lower-end capabilities for certain features and parameters, has gained importance at least partially in the context of industrial wireless sensors, video surveillance, and wearable devices. One objective has become to reduce UE bandwidth from 100 MHz—currently mandated in the 3GPP standard (Rel-15/16) for normal NR devices—to 20 MHz for reduced capability (referred to as "redcap") devices. Accordingly, support has been established for a reduced maximum bandwidth (BW) UE, identifying a maximum bandwidth of 20 MHz during and after initial access. The possibility of, and any associated conditions for, optional support of a wider bandwidth up to 40 MHz is also under consideration.

In the current 3GPP standard (Rel-15/16), the initial downlink/uplink bandwidth part (DL/UL BWP) may be configured up to the entire component carrier (CC) bandwidth, which is larger than the limited (e.g. 20 MHz on frequency range 1; FR1) capability of redcap devices. From the perspective of scheduling complexity and resource utilization it may be beneficial to have the same initial operating DL and UL BWP parameters for redcap UEs and non-redcap UEs (also referred to herein as legacy UEs). However, the use of shared initial BWPs raises at least a couple of issues related to the random access procedure and PUCCH transmission with frequency hopping for redcap devices.

A first issue is how to enable frequency hopping operation, e.g. for Msg4 PUCCH during an initial access procedure (e.g. a random access channel, RACH, procedure), in case of radio frequency (RF) retuning. RF retuning refers to a UE adjusting its communication frequency (e.g. by tuning its RF module's central frequency from a first frequency, f1, to a second frequency, f2, for transmission), in case the frequency gap between two consecutive transmissions/receptions is larger than the current RF bandwidth. For example, a given UE may perform retuning when the frequency gap between two consecutive UL transmissions (e.g. PUCCHs/PUSCHs) is 40 MHz while the RF bandwidth capability of the given UE is just 20 MHz.

A second issue is how to handle physical RACH (PRACH) occasions associated with the best Synchronization Signal Block (SSB) when the frequency gap between the PRACH resources and the best SSB is greater than the BW supported by the UE.

Pursuant to the above, various embodiments are disclosed herein for a redcap UE to perform initial uplink communications over an initial uplink bandwidth part (BWP) shared with other UEs, with the initial uplink BWP having a higher bandwidth than the BW supported by the redcap UE with respect to the other UEs. In addition, various solutions to at least the above listed issues may be implemented to improve the resource efficiency when redcap UEs and non-redcap (also referred to as legacy or normal) UEs share a BWP having a higher BW than that supported by the redcap UE alone. Accordingly, as disclosed herein, a variety of approaches may be used for PUCCH transmissions that allow for sharing an initial UL BWP larger than a maximum BW (e.g. 20 MHz) supported by redcap UEs or redcap devices. Seven different approaches for addressing the first issue, and at least one approach addressing the second issue are further discussed below.

Considerations for First Issue

As noted above, the first issue is related to enabling FH for redcap UEs and non-redcap UEs using a shared BWP having a higher BW than that supported by redcap UEs. FH operation is enabled by default for a set of UL transmissions during initial access (e.g. RACH) procedure. Thus, RF retuning necessitated by FH operations may happen for a variety of different transmission scenarios and is not limited to Msg4 PUCCH during initial access. However, it should be noted that certain solutions are applicable for Msg4 PUCCH during initial access. In other words, by way of example, various solutions disclosed herein are applied when a PUCCH resource pool is shared between redcap and non-redcap UEs, which occurs for PUCCH for Msg4 during initial access. However, various embodiments of the solutions discussed herein may be equally applicable for other the cases when a PUCCH resource pool is shared between redcap and non-redcap UEs and frequency hopping is enabled for PUCCH transmission. Among such cases, PUCCH for Msg4 may be considered one typical example.

Considerations for Second Issue

The 'best' SSB may be considered from the perspective of a given UE. When the UE powers on, it typically performs a cell search. From a system perspective, there may be multiple SSBs with each SSB covering one particular direction/sector. For SSB detection, the UE may typically perform a cross-correlation operation for the detected SSB sequence with different hypothetical assumptions. The "best SSB" may refer to the SSB, among the multiple detected SSBs, having a maximum peak value during the cross-correlation operation. In other words, a UE in one location may detect multiple SSBs and may select one from multiple detected SSBs based on the peak value of cross-correlation operation to perform the subsequent RACH procedure based on the selected "best" SSB. A one-to-one mapping exists between an SSB and a corresponding PRACH. For a given UE, the frequency gap between the "best" SSB and the corresponding PRACH resource may be larger than the maximum BW that is supported by redcap devices (e.g. 20 MHz on FR1), which necessitates RF retuning by the UE. After a PRACH transmission, the UE monitors the corresponding Msg2 scheduling over PDSCH with RF retuning again.

Implementations

At least seven different example for addressing the first issue, and at least one example addressing the second issue are further discussed below.

FH—First Approach

According to some embodiments, the initial UL BWP may be shared between redcap and non-redcap devices with the definition of redcap-specific PUCCH resources. A separate physical resource block (PRB) Offset ($\Delta_{offset}^{Redcap}$) for frequency hopping (FH) may be explicitly configured in the physical uplink control channel (PUCCH). A common resource information element (common resource IE) in the System Information Block (SIB; e.g. SIB1) may be explicitly configured with the following restriction:

$$N_{BWP}^{size} - 2\Delta_{offset}^{Redcap} \leq BW_{Redcap}.$$

Figure 6:
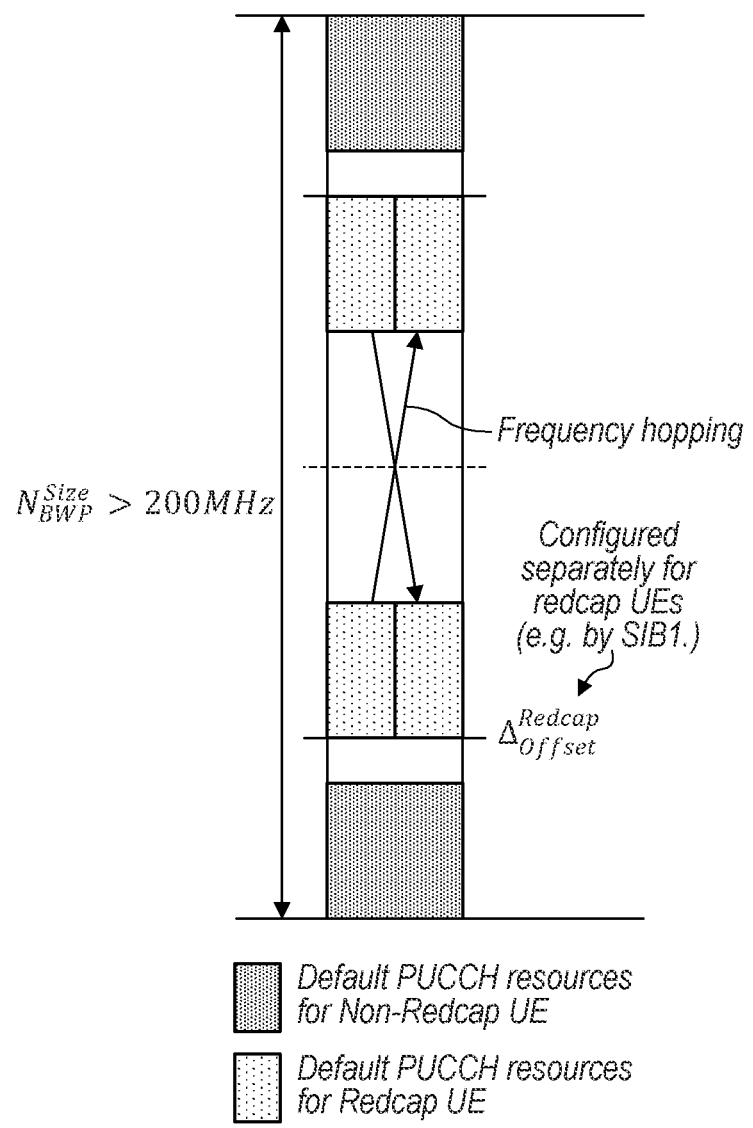
FIG. 6 shows a simplified diagram illustrating default physical uplink control channel (PUCCH) resource configuration specific to a reduced capability (redcap) device, according to some embodiments.

$N_{BWP}^{size}$ represents the size of the (shared) BWP, and $BW_{Redcap}$ represents the (supported) bandwidth of redcap devices (e.g. 20 MHz). If $\lfloor r_{PUCCH}/8 \rfloor = 0$, where $r_{PUCCH}$ is the PUCCH resource index, the redcap UE may determine the physical resource block (PRB) index of the PUCCH transmission in the first hop as $\Delta_{offset}^{Redcap} + \lfloor r_{PUCCH}/N_{CS} \rfloor$, and the PRB index of the PUCCH transmission in the second hop as $N_{BWP}^{Size} - 1 - \Delta_{offset}^{Redcap} - \lfloor r_{PUCCH}/N_{CS} \rfloor$, where $N_{CS}$ is the total number of initial cyclic shift (CS) indexes configured by SIB1. If $\lfloor r_{PUCCH}/8 \rfloor = 1$, the redcap UE may determine the PRB index of the PUCCH transmission in the first hop as $N_{BWP}^{Size} - 1 - \Delta_{offset}^{Redcap} - \lfloor r_{PUCCH} N_{CS} \rfloor$, and the PRB index of the PUCCH transmission in the second hop as $\Delta_{offset}^{Redcap} - \lfloor r_{PUCCH} N_{CS} \rfloor$. This is illustrated in FIG. 6, which shows a simplified diagram illustrating default PUCCH resource configuration specific to a reduced capability (redcap) device, indicating the $\Delta_{offset}^{Redcap}$. As seen in FIG. 6, the resources for transmissions by the redcap device are bounded by the separately configured PRB offset $\Delta_{offset}^{Redcap}$.

FH—Second Approach

According to some embodiments, an initial UL BWP may be shared between a redcap UE and a legacy UE even when $N_{BWP}^{Size} > BW_{redcap}$, without defining redcap specific PUCCH resources (in contrast to the first approach above). According to current 3GPP specifications, during an initial access procedure, the frequency hopping (FH) is always enabled and the resource block (RB) for PUCCH is distributed at the edges of the initial UL BWP to provide frequency diversity. In the time domain, the PUCCH spans a set of consecutive symbols to avoid resource fragmentation.

In some embodiments, redcap PUCCH (R-PUCCH) transmission resources and non-redcap PUCCH transmission resources may be separate (differing from each other) or may be partially shared. Accordingly, time division multiplexing (TDM) may be employed for both R-PUCCH and PUCCH as opposed to the frequency division multiplexing (FDM) employed for the first approach. In some implementations dedicated R-PUCCH TDM resources may be reserved (see Alternative 1 below, for example), while in some implementations certain TDM resources may be shared between R-PUCCH and PUCCH for the first FH while certain TDM R-PUCCH resources may be separate from PUCCH resources for the second FH (see Alternative 2 below, for example). The difference between the two aforementioned alternatives may be in how different respective control signaling overhead is used for determining/designating the R-PUCCH and PUCCH resources.

Pursuant to the above, denoting the length of an R-PUCCH transmission in terms of OFDM symbols as $N_{symbol}^{R-PUCCH}$, $\lfloor N_{symbol}^{R-PUCCH}/2 \rfloor$ symbols may be transmitted in the first hop with the remaining symbols transmitted in the second hop. The start symbol in the first hop and the second hop of an R-PUCCH may be indicated by $n_{R-PUCCH}^{start,0}$ and $n_{R-PUCCH}^{start,1}$, respectively. In some embodiments, $N_{symbol}^{R-PUCCH}$ may be indicated to the UE in SIB1 by introducing a new IE in SIB1, or it may be indicated through an index into a table, for example an index into the row of a hard-encoded table in the (3GPP) specification that includes a set of predefined values corresponding to respective PUCCH formats, e.g. 2 for PUCCH format 0 and 4 or 10 or 14 for PUCCH format 1.

Figure 7:
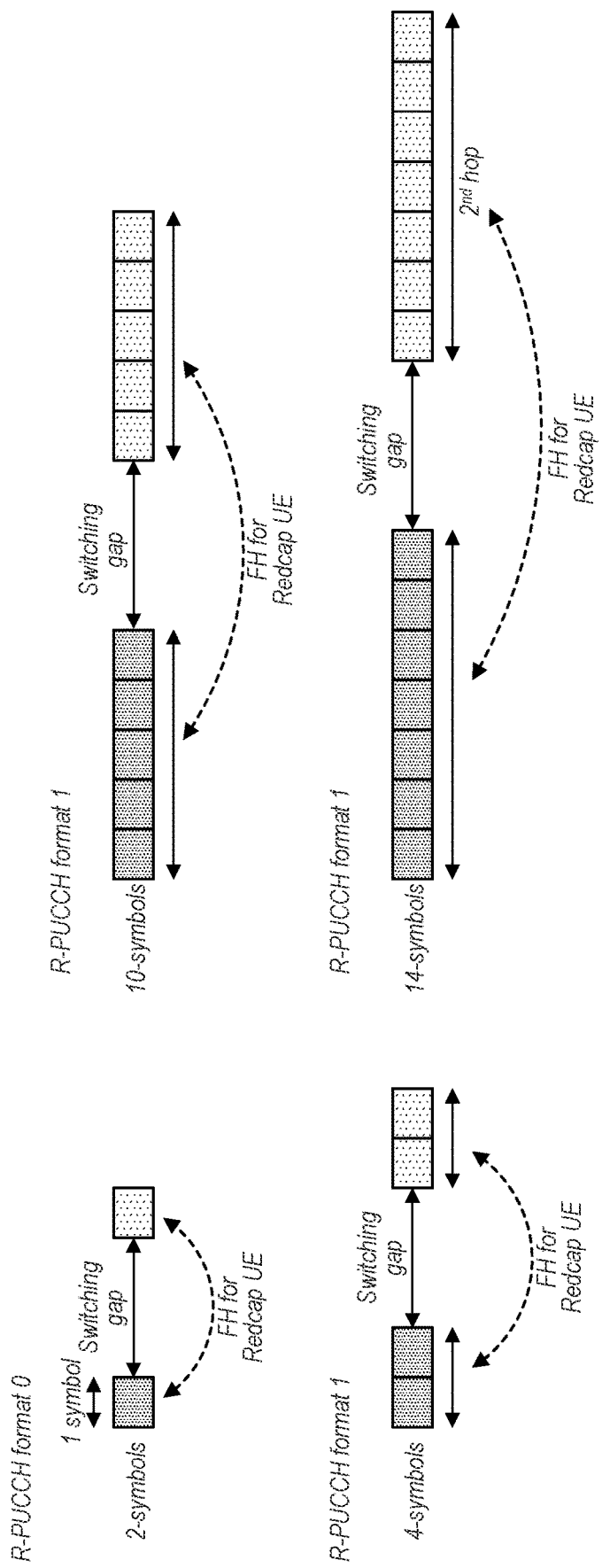
FIG. 7 shows a simplified timing diagram illustrating a PUCCH format specific to a redcap device, with frequency hopping enabled, according to some embodiments.

FIG. 7 shows a simplified timing diagram illustrating redcap-specific PUCCH formats, with frequency hopping enabled. It should be noted that as previously mentioned, according to this approach, no redcap-specific PUCCH resources (based on FDM) are defined, but redcap-specific PUCCH formats (based on TDM) for use of the overall PUCCH resources may be defined/provided. Examples are provided for 2, 4, 10, and 14 symbol PUCCH transmissions. As seen in FIG. 7, in each case, one-half of the symbols are transmitted in the first hop and the remaining one-half of the symbols are transmitted in the second hop.

Furthermore, in some embodiments, for a given PUCCH resource, the symbols in the first hop and the second hop may be located in different slots n and n+k, where $k \geq T_{gap}^{switch}$ may be hard-encoded in the 3GPP specification, with $T_{gap}^{switch}$ representing the switching gap between the hopped frequencies (e.g. between the first frequency hop and the second frequency hop), taking into account various factors such as RF retuning delay, for example, in order to distribute PUCCH over PRB(s) at the edge of the initial UL BWP. A single R-PUCCH may be within a single slot (i.e. k=0 and $N_{symbol}^{R-PUCCH}+T_{gap}^{switch} \leq 14$ symbols) or within two consecutive slots (i.e. k=1) or two non-contiguous slots (i.e. k>1).

A variety of alternatives may be considered for the start symbol of different frequency hops to enable time division multiplexing (TDM) between R-PUCCH and PUCCH resources within a single slot.

Alternative 1: When $k \geq 1$, $n_{R-PUCCH}^{start,1} = n_{R-PUCCH}^{start,0} + N_{symbol}^{R-PUCCH}/2$. Different variations may be considered for the signaling of $n_{R-PUCCH}^{start,0}$ value.

1-1: The value of $n_{R-PUCCH}^{start,0}$ may be explicitly signaled in SIB1 message for redcap devices.

1-2: The value of $n_{R-PUCCH}^{start,0}$ may be implicitly determined based the start symbol of PUCCH $n_{R-PUCCH}^{start,i}$ broadcasted in SIB1 for legacy UEs, and the R-PUCCH length $N_{symbol}^{R-PUCCH}$: $n_{R-PUCCH}^{start,0} = n_{PUCCH}^{start} - N_{symbol}^{R-PUCCH}$.

Figure 8:
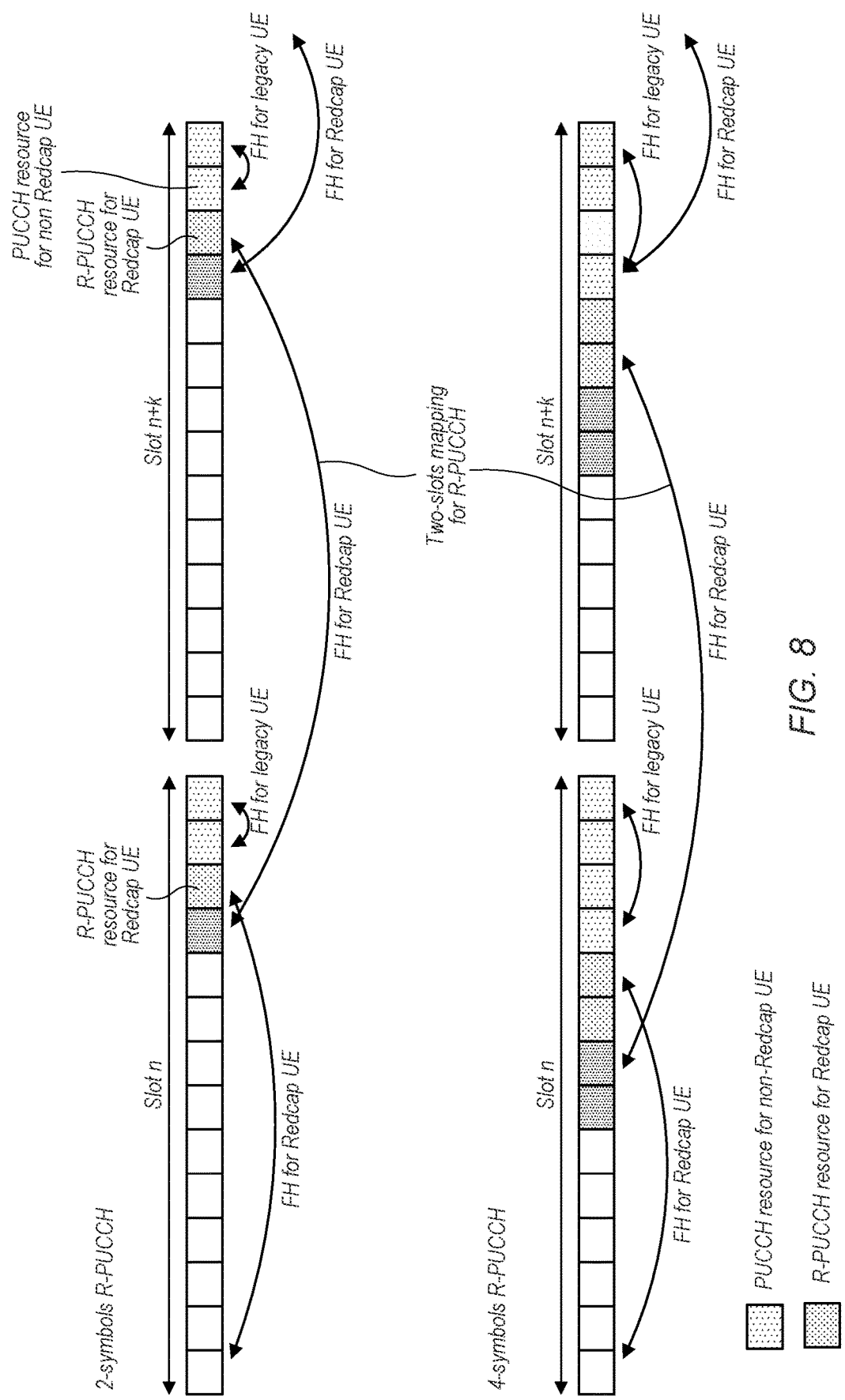
FIG. 8 shows a simplified timing diagram illustrating a two-slot mapping for a redcap-PUCCH (R-PUCCH) that enables time division multiplexing (TDM) with a (non-redcap) PUCCH, according to some embodiments.

FIG. 8 provides one example of Alternative 1 for a two-slot R-PUCCH determination, when $N_{symbol}^{R-PUCCH}=2, 4$. Referring to FIG. 8, $n_{R-PUCCH}^{start,0}=10$ (for 2-symbol R-PUCCH) or 6 (for 4-symbols R-PUCCH) may be either explicitly signaled in SIB1 (per 1-1 above) or implicitly determined (per 1-2 above) such that the R-PUCCH resources for redcap UEs and legacy UEs are time division multiplexed within a slot and occupying a same number of PRBs.

Alternative 2: To further reduce signaling overhead, a different start symbol may be considered for sharing the PUCCH resources for the first hop of the R-PUCCH, and allocating dedicated resources for the second hop, which results in different start symbols for the first hop and the second hop for a given R-PUCCH resource. The start symbols for the first hop and second hop, respectively, may be defined as:

$$n_{R-PUCCH}^{start,0} = n_{PUCCH}^{start}$$

$$n_{R-PUCCH}^{start,1} = n_{PUCCH}^{start} - N_{symbol}^{R-PUCCH}/2.$$

Figure 9:
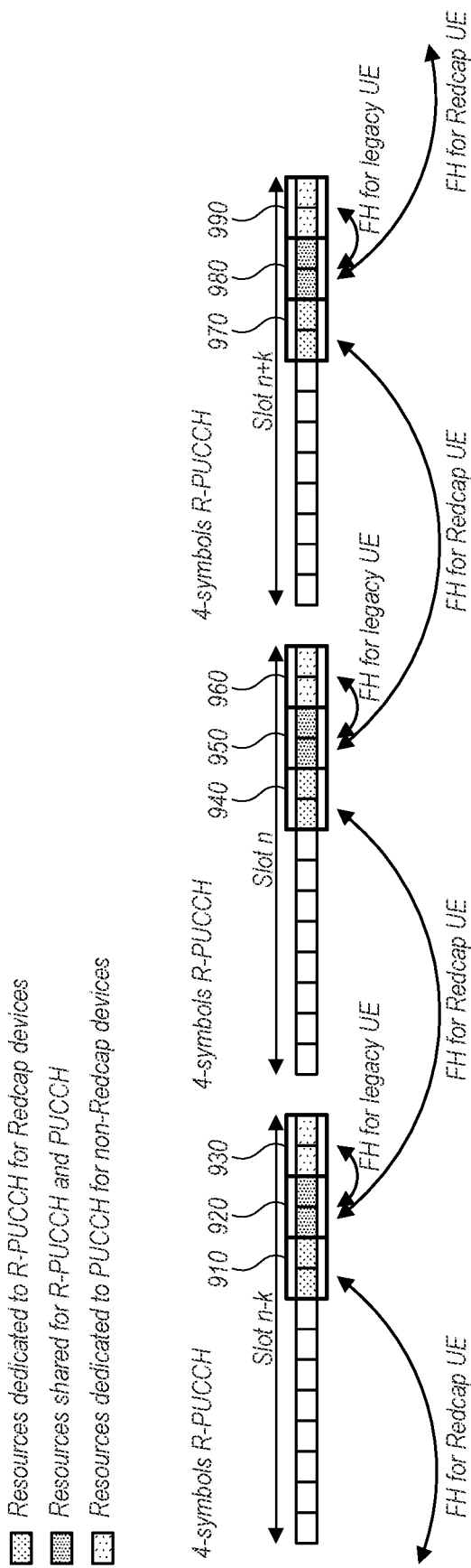
FIG. 9 shows a simplified timing diagram illustrating partially shared resources for multi-slot R-PUCCH and PUCCH transmissions, according to some embodiments.

FIG. 9 provides one example of the above, for a 4-symbol PUCCH and R-PUCCH with frequency hopping. Referring to FIG. 9, the resources 930/960/980 are dedicated for PUCCH transmission in the second hop for legacy (non-redcap) devices. Similarly, the resources 910/940/970 starting from $n_{R-PUCCH}^{start,1}=10-2=8$ are reserved for R-PUCCH transmission in the second hop for redcap devices. However, the 2-symbol resources 920/950/980 starting from $n_{R-PUCCH}^{start,1}=10$ are shared between R-PUCCH and PUCCH transmissions without any restriction at the base station (e.g. at the gNB) due to a shared control resource set (CORESET) for DCI Format 0_0 transmission. In comparison to Alternative 1, which provides the same PUCCH/R-PUCCH capability, the signaling overhead is reduced by at least 25%.

Alternative 3: Presently, in an initial access procedure the PUCCH resource is determined by using a combination of the PUCCH Resource Indictor (PRI) IE of a DCI 0_0 that schedules a Msg4, and the allocated control channel element (CCE) that carries the DCI 0_0. As set out in the 3GPP (Release 15/16) specification, if the UE provides HARQ-ACK information in a PUCCH transmission in response to detecting a DCI format scheduling a PDSCH reception or a semi persistent scheduling (SPS) PDSCH release, the UE determines a PUCCH resource with index $r_{PUCCH}$, $0 \leq r_{PUCCH} \leq 15$ as $$r_{PUCCH} = \left\lceil \frac{2 \cdot n_{CCE,0}}{N_{CCE}} \right\rceil + 2 \cdot \Delta_{PRI},$$

where $N_{CCE}$ is a number of CCEs in a CORESET of a PDCCH reception with the DCI format, as described in Clause 10.1, $n_{CCE,0}$ is the index of a first CCE for the PDCCH reception, and $\Delta_{PRI}$ is a value of the PUCCH resource indicator field in DCI format.

Based on the above, in some embodiments, the resources between PUCCH and two-slot R-PUCCH may be fully shared. For example, restriction of $\Delta_{PRI} \leq 3$ (i.e. 0 or 1 or 2 or 3) for PUCCH and $\Delta_{PRI} > 3$ (i.e. 4 or 5 or 6 or 7) for R-PUCCH may be introduced to split resources between PUCCH and R-PUCCH. Limiting $\Delta_{PRI} \leq 3$ (e.g., equal to 0, 1, 2, or 3) effectively restricts the PUCCH resources for legacy UEs to be within consecutive PRBs at one edge of the initial BWP. Correspondingly, for redcap UEs, for $\Delta_{PRI} > 3$ (e.g. equal to 4, 5, 6, or 7) leads to limit the PRBs for R-PUCCH to be within PRB sets at the other edge of the initial UL BWP. The start symbol of the first hop and second hop, respectively, may be defined as follows to accommodate the switching gap for R-PDCCH:

$$n_{R\text{-}PUCCH}^{start,0} = n_{PUCCH}^{start}$$

$$n_{R\text{-}PUCCH}^{start,1} = n_{PUCCH}^{start} + N_{symbol}^{R\text{-}PUCCH}/2.$$

Figure 10:
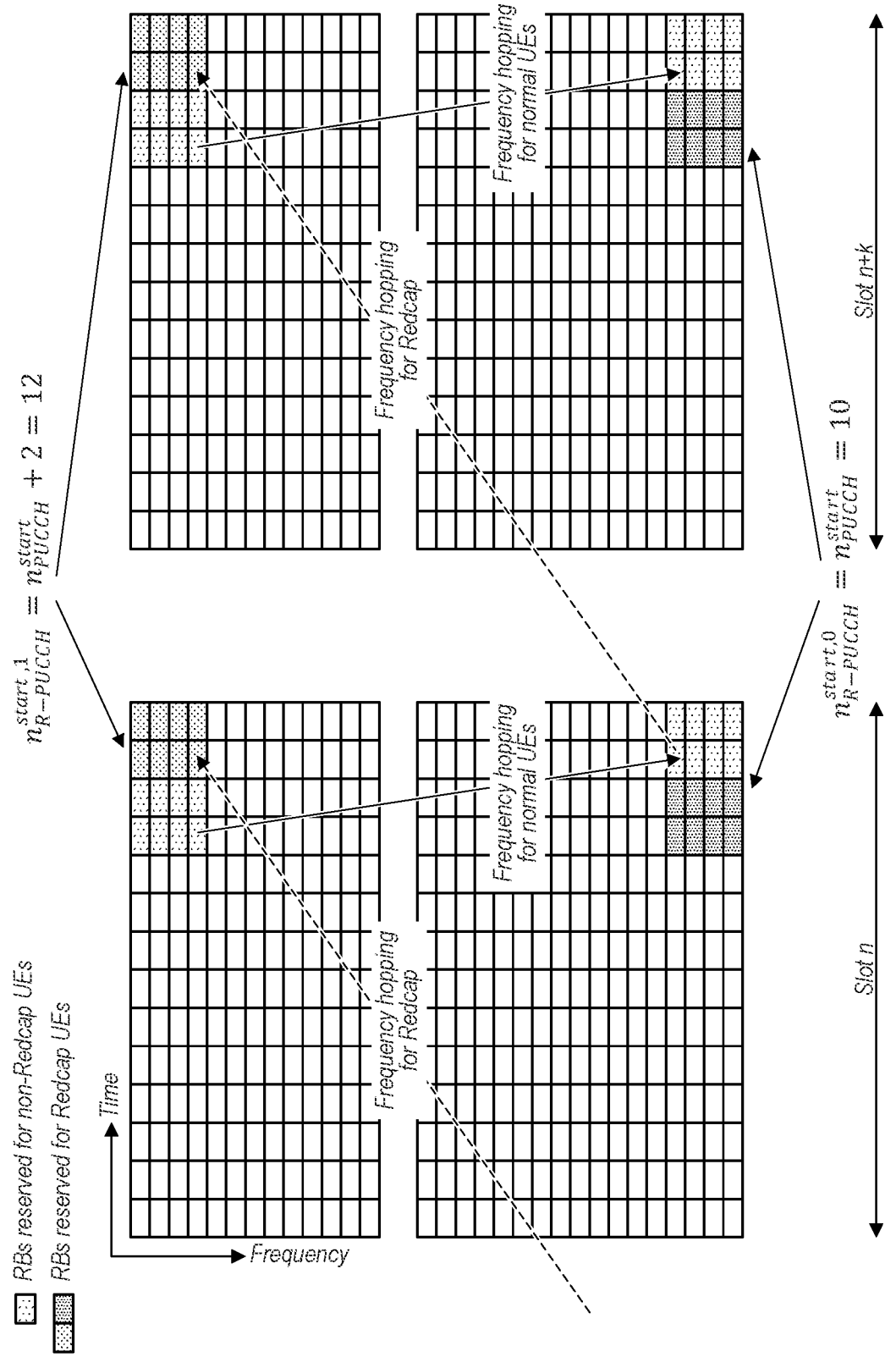
FIG. 10 shows a simplified diagram illustrating resource configuration for fully shared resources for multi-slot R-PUCCH and PUCCH transmissions, according to some embodiments.

FIG. 10 provides one example of an implementation of Alternative 3 with a 4-symbol PUCCH format 1 configured for PUCCH transmission in initial access phase. Referring to FIG. 10, by limiting the $\Delta_{PRI} \leq 3$ (e.g. equal to 0, 1, 2, or 3), only PUCCH index $r_{PUCCH} < 8$ is used and mapped to the 4 PRBs reserved for non-redcap (legacy) UEs. After the base station identifies redcap UE devices in earlier steps, e.g. based on the detection of dedicated PRACH resource reserved for redcap UEs, the base station may use the code state of $\Delta_{PRI} \geq 4$ such that the R-PUCCH for redcap UEs is refined within the non-overlapped 4-RBs. It should be noted that the frequency hopping for R-PUCCH may still be performed over two slots n and n+k to accommodate the switching gap. In comparison to Alternatives 1 and 2, Alternative 3 does not increase the overhead of PUCCH resources from a system perspective at the cost of a scheduling restriction for the base station about the $\Delta_{PRI}$ usage.

FH—Third Approach

TDM-based resource allocation for R-PUCCH and PUCCH within a slot is feasible for a 2-symbol PUCCH or a 4-symbol PUCCH, but may not be possible for 10-symbol or 14-symbol configurations (such as the 10-symbol and 14-symbol configurations illustrated in FIG. 7). A third approach may therefore include mapping the R-PUCCH to RBs that are non-overlapped with that of the PUCCH in frequency domain.

Figure 11:
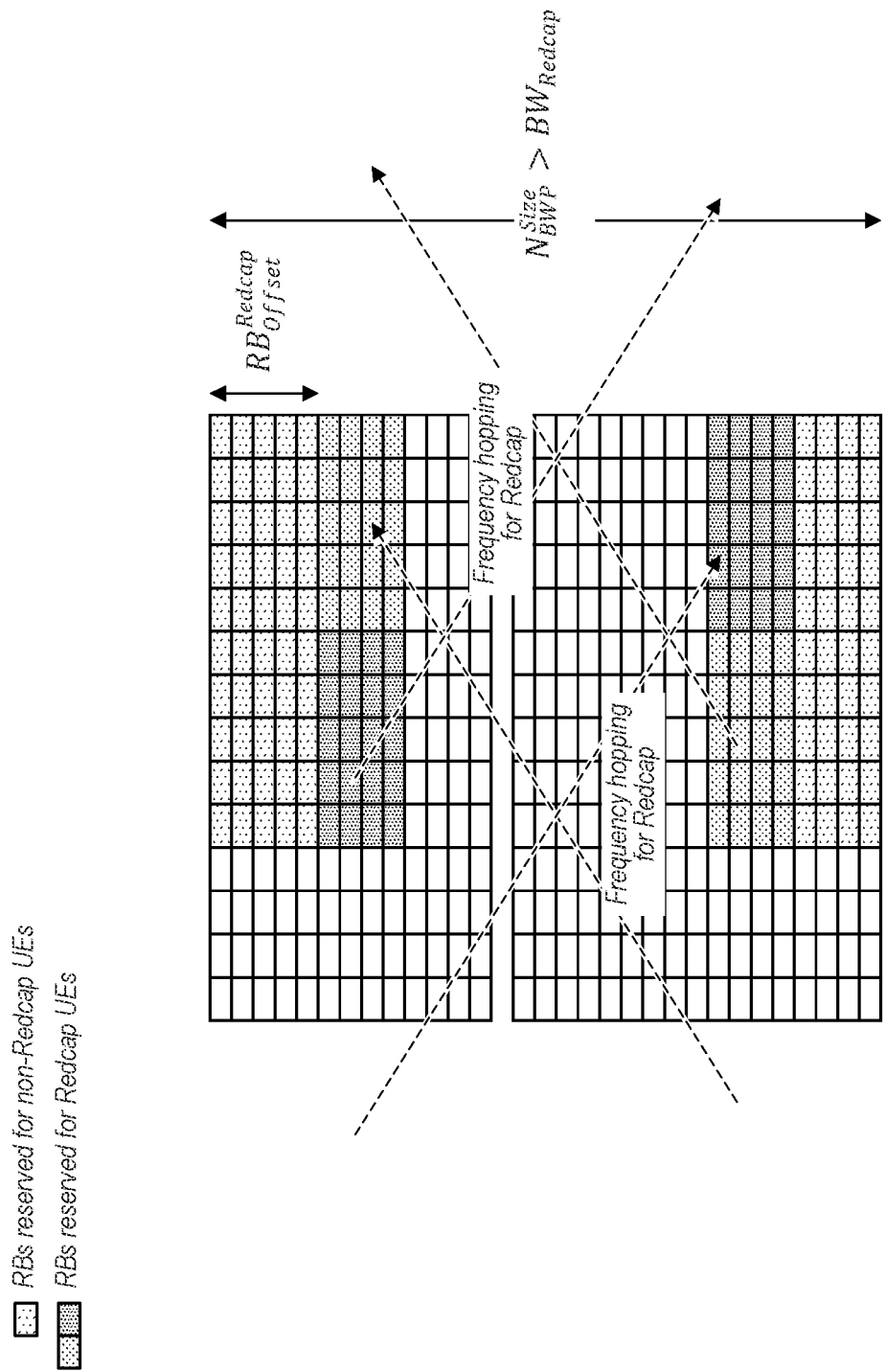
FIG. 11 shows a simplified diagram illustrating resource configuration for frequency division multiplexed (FDM) R-PUCCH and PUCCH resource allocation with a resource block offset, according to some embodiments.

The start symbols of the R-PUCCH in different hops may therefore be determined as follows (similar to Alternative 2 of the second Approach above):

$n_{R\text{-}PUCCH}^{start,0} = n_{PUCCH}^{start}$; and
$n_{R\text{-}PUCCH}^{start,1} = n_{PUCCH}^{start} + N_{symbol}^{R\text{-}PUCCH}/2$ A separate PRB Offset $RB_{offset}^{Redcap}$ maybe configured as part of SIB1 message to provide flexibility to gNB. Alternatively, $RB_{offset}^{Redcap}$ maybe implicitly determined as: $RB_{offset}^{Redcap} = K/(2 \ast N_{CS})$ where K is hard-encoded in specification and $N_{CS}$ is total number of initial CS indexes configured by SIB1 message. FIG. 11 provides one example of resource determination for a 10-symbol R-PUCCH format assuming $N_{CS}=2$, and $K=16$. Correspondingly $RB_{offset}^{Redcap} = 16/(2 \ast 2) = 4$ in accordance with this approach.

FH—Fourth Approach

Figure 12:
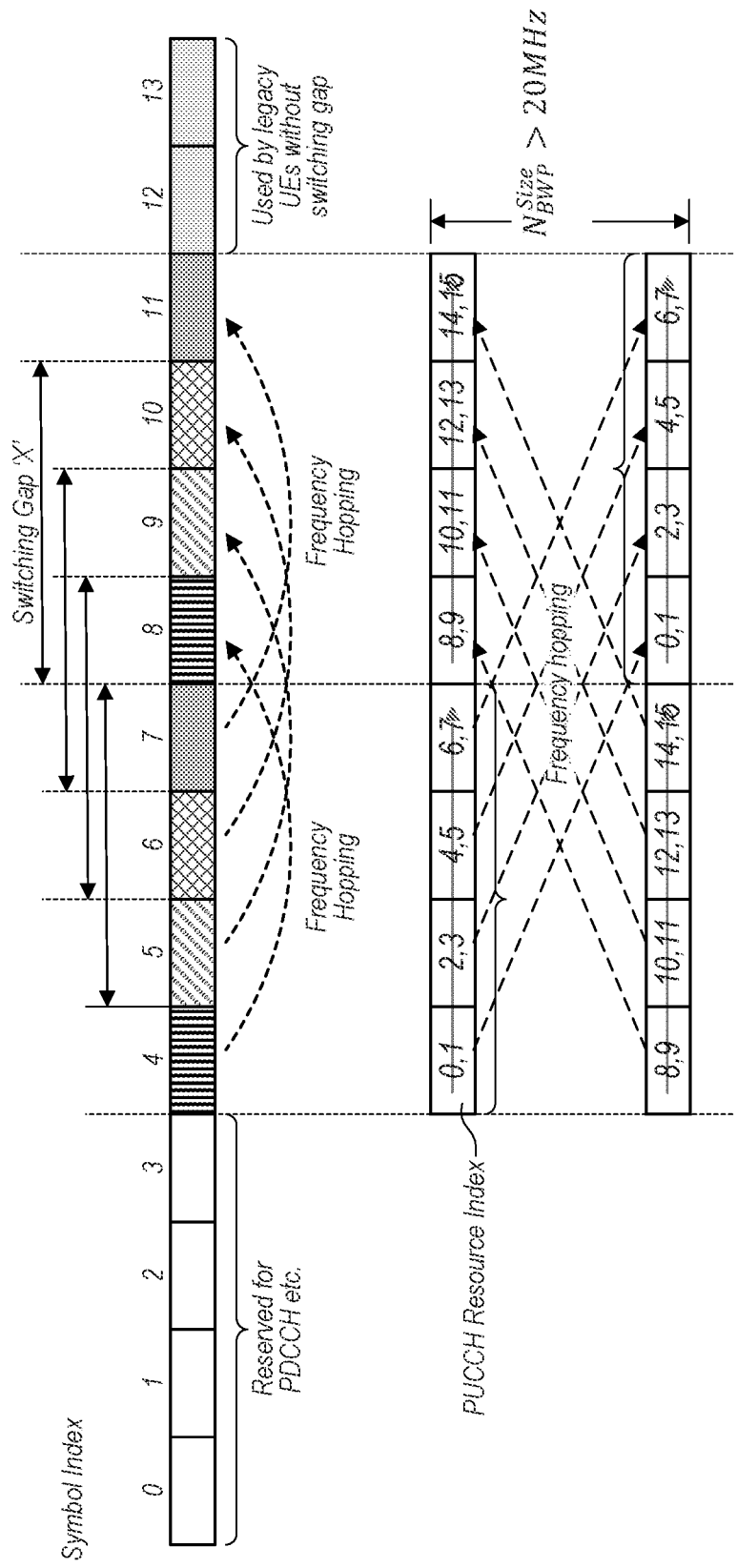
FIG. 12 shows a simplified timing diagram illustrating a redcap-specific PUCCH resource allocation for a two (2) symbol PUCCH with a three symbol (3 symbol) switching gap, according to some embodiments.

A fourth approach may include interlacing R-PUCCH resources in a TDM manner to avoid time-domain segmentations caused by RF retuning. For example, if the switching gap is X symbols, where X=2 or 3 or 4, 2-symbol R-PUCCH or 4-symbol R-PUCCH resources may be interlaced in a TDM manner to avoid time-domain segmentations caused by RF retuning. For example, 'X+1' time-domain interlaced R-PUCCHs may be defined to span all symbols until the first symbol of PUCCH in a same slot. FIG. 12 provides one example of an interlaced 2-symbol R-PUCCH, assuming a switching gap of X=3 symbols and two CS indexes per PRB. Referring to FIG. 12, four time-interlaced resources with pair-symbol index <4, 8>, <5, 9>, <6, 10> and <7, 11> may be used for R-PUCCH to span symbol indexes #4 to #11. As one consequence, two PRBs, each at one edge of the initial UL BWP may be sufficient to provide sixteen (16) R-PUCCH resources for an initial access procedure.

FH—Fifth Approach

According to a fifth approach, the frequency hopping for R-PUCCH may be disabled by default under certain specific conditions, e.g. if the shared initial UL BWP size $N_{BWP}^{Size} > BW_{redcap}$.

FH—Sixth Approach

Figure 13:
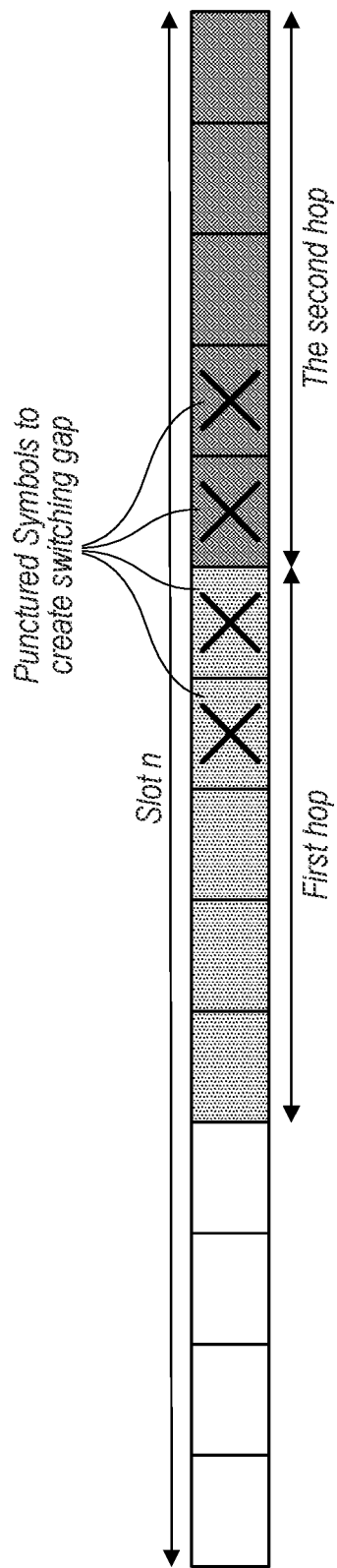
FIG. 13 shows a simplified timing diagram illustrating a puncturing-based PUCCH format for redcap devices, according to some embodiments.

According to a sixth approach, certain symbols of the first hop and/or certain symbols of the second hop may be punctured (e.g. the symbols may be unused or may be designate as not to be used) for certain PUCCH formats, to create a switching gap of a specified or designated length. For example, for a 10-symbol or 14-symbol PUCCH format, the last $T_{gap}^{switch}/2$ symbols of the first hop and the first $T_{gap}^{switch}/2$ symbols of the second hop may be punctured to create the switching gap with length $T_{gap}^{switch}$. FIG. 13 provides one example of this approach, assuming a 10-symbol PUCCH format 0 is used for redcap UEs with frequency hopping enabled. Referring to FIG. 13, assuming $T_{gap}^{switch}=4$, according to this approach, $T_{gap}^{switch}/2=2$ symbols may be punctured at the end of first hop and at the start of the second hop to create the switching gap for RF retuning. Consequently, only three (3) symbols remain for each hop (3/5=60% effective resource) which may result in degraded PUCCH detection performance compared to normal/legacy/non-redcap NR devices.

FH—Seventh Approach

According to a seventh approach, a set of redcap-specific initial UL BWPs may be explicitly configured in a system information block (e.g. SIB1), limiting the BW to a value up to the BW supported by redcap devices ($BW_{Redcap}$). Alternatively, instead of configuring multiple redcap-specific initial UL BWPs, different frequency offsets $\Delta_{offset}$ may be provided in SIB1 with a predefined $BW_{Redcap}$ (e.g. 20 MHz) to create a set of redcap-specific initial UL BWPs.

Handling PRACH Occasions

Figure 14:
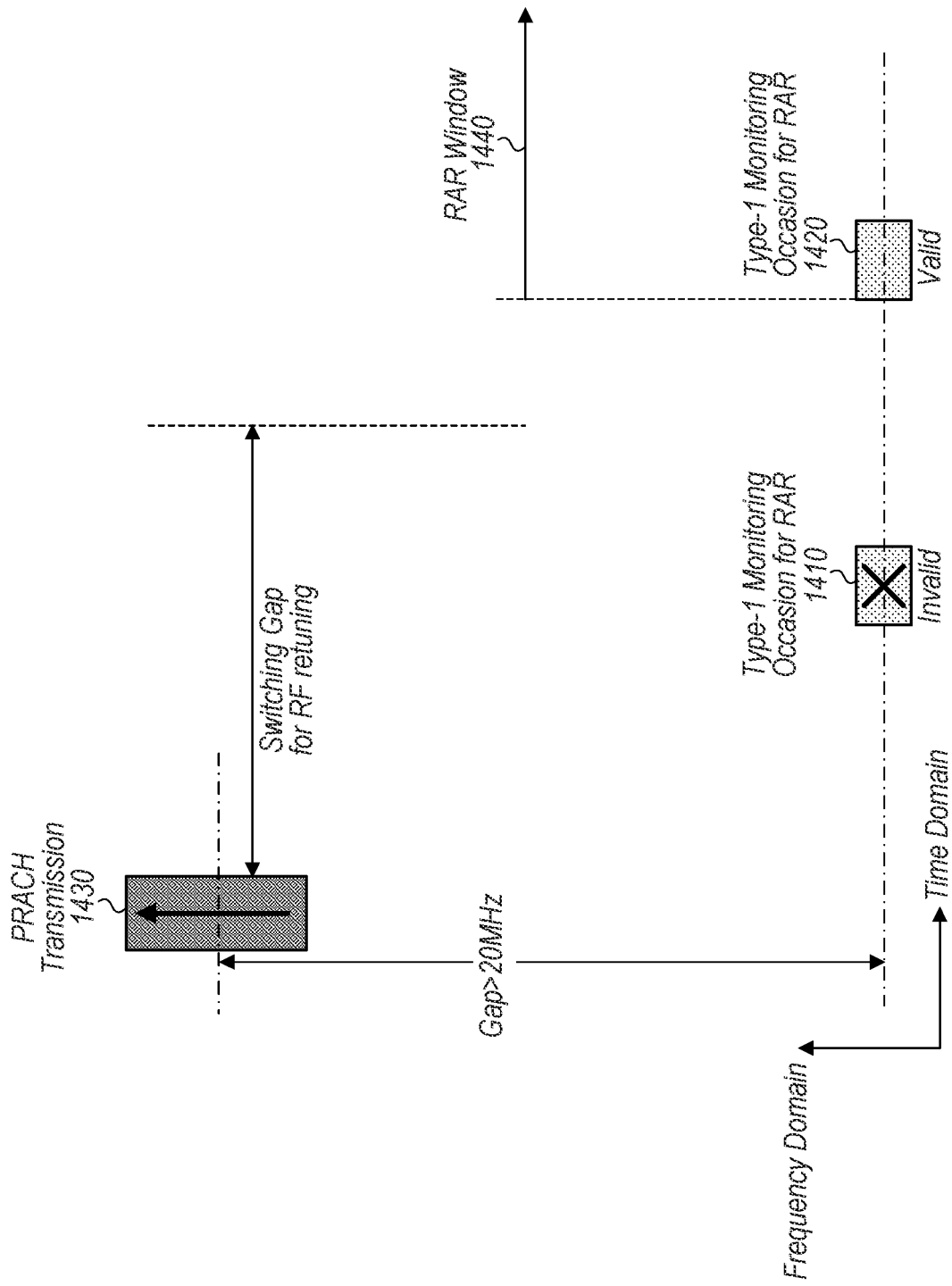
FIG. 14 shows a simplified diagram illustrating resource configuration for a redcap-specific random access response (RAR) window determination with a radio frequency (RF) retuning gap, according to some embodiments.

In some embodiments, certain restrictions may be considered to create a gap for redcap devices to perform RF retuning between a PRACH transmission and a subsequent PDCCH monitoring for RAR reception when the frequency gap is larger than $BW_{Redcap}$. In some cases, when RF retuning is needed, the RAR window may start at the first symbol of the earliest CORESET on which the UE is configured to receive PDCCH (e.g. for type1-PDCCH CSS set), that is at least $T_{gap}^{switch}$ symbols, following the last symbol of the PRACH occasion corresponding to the PRACH transmission. FIG. 14 provides one example of RAR window determination for redcap UEs when the frequency gap between the selected PRACH in the initial UL BWP and the CORESET with Type-1 monitoring occasion (MO) is larger than 20 MHz. Referring to FIG. 14, the first Type-1 MO for RAR monitoring after PRACH transmission 1430 is MO 1410, which is the start symbol of the RAR for non-redcap (or standard or legacy) UEs. However, for redcap UEs, this MO 1410 is invalid as it is within the switching gap. As one consequence, the RAR window 1440 for redcap UEs may start from the MO 1420, which occurs later than the end symbol of the switching gap.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to:
cause a device having reduced capabilities relative to a second device to perform initial wireless uplink communications over an initial uplink bandwidth part (BWP) indicated in a system information block (SIB), wherein a physical resource block (PRB) index for a physical uplink control channel (PUCCH) transmission comprised in the initial wireless uplink communications is determined as one of:
an offset added to a function defined as a PUCCH resource index divided by a total number of initial cyclic shift (CS) indexes, or
a bandwidth (BW) of the initial uplink BWP minus each of the offset, the function, and the value one (1); and
wherein the offset is configured separately for the device and is not used by the second device.

2. The apparatus of claim 1, wherein the processor is configured to further cause the device to:
perform the initial wireless uplink communications using frequency resources within the initial uplink BWP.

3. The apparatus of claim 2, wherein the frequency resources are configured based on the PRB index.

4. The apparatus of claim 1, wherein the offset is used to determine the resources for frequency hopping.

5. The apparatus of claim 1, wherein the offset is explicitly configured in a PUCCH common resource information element (IE) of the SIB.

6. The apparatus of claim 1, wherein frequency hopping for the device is disabled.

7. The apparatus of claim 1, wherein the device and the second device share the initial BWP.

8. A device having reduced capabilities relative to a second device, the device comprising:
radio circuitry configured to enable wireless communications of the device; and
a processor communicatively coupled to the radio circuitry and configured to interoperate with the radio circuitry to:
perform initial wireless uplink communications over an initial uplink bandwidth part (BWP) indicated in a system information block (SIB), wherein a physical resource block (PRB) index for a physical uplink control channel PUCCH transmission comprised in the initial wireless uplink communications is determined as one of
an offset added to a function defined as a PUCCH resource index divided by a total number of initial cyclic shift (CS) indexes, or
a bandwidth (BW) of the initial uplink BWP minus each of the offset, the function, and the value one (1); and
wherein the offset is configured separately for the device and is not used by the second device.

9. The device of claim 8, wherein the processor is configured to further interoperate with the radio circuitry to:
perform a PUCCH transmission using specific resources that are time-division multiplexed with PUCCH resources used by the second device within the initial uplink BWP when the device shares the initial BWP with the second device.

10. The device of claim 9, wherein the time-division multiplexed PUCCH resources are exclusively reserved for the PUCCH transmission of the device within the initial uplink BWP.

11. The device of claim 9, wherein at least a first portion of the specific resources is shared with the second device during a first frequency hop and wherein a second portion of the specific resources is reserved for use by the device during a second frequency hop.

12. The device of claim 9, wherein the specific resources are shared between the device and the second device for respective transmissions of the PUCCH by the device and another PUCCH by the second device.

13. The device of claim 9, wherein the specific resources for the device are mapped to resource blocks (RBs) that do not overlap in the frequency domain with RBs of resources used by the second device to perform its own PUCCH transmission in the initial uplink BWP.

14. The device of claim 9, wherein the processor is configured to further interoperate with the radio circuitry to perform the PUCCH transmission via at least a first frequency hop and a second frequency hop, wherein certain symbols of the first frequency hop and certain symbols of the second frequency hop are punctured to create a switching gap of a specified length between the first frequency hop and the second frequency hop.

15. The device of claim 9, wherein the specific resources are included in a single slot that also includes time-division multiplexed resources for initial uplink transmissions performed by the second device.

16. A non-transitory memory element storing instructions executable by a processor to cause a device having reduced capabilities relative to a second device to:
perform initial wireless uplink communications over an initial uplink bandwidth part (BWP) indicated in a system information block (SIB), wherein a physical resource block (PRB) index for a physical uplink control channel (PUCCH) transmission comprised in the initial wireless uplink communications is determined as one of:
an offset added to a function defined as a PUCCH resource index divided by a total number of initial cyclic shift (CS) indexes, or
a bandwidth (BW) of the initial uplink BWP minus each of the offset, the function, and the value one (1); and
wherein the offset is configured separately for the device and is not used by the second device.

17. The non-transitory memory element of claim 16, wherein a random access response (RAR) window, for the device monitoring a physical downlink control channel (PDCCH) subsequent to a random access procedure for a corresponding RAR, is configured to start at a first symbol of an earliest control resource set on which the device is set to receive the PDCCH.

18. The non-transitory memory element of claim 17, wherein the earliest control resource set is located at least a specified number of symbols after a last symbol of an associated physical random access channel (PRACH) occasion.

19. The non-transitory memory element of claim 18, wherein a value of the specified number is hard-encoded or reported by the device via a user equipment (UE) capability report by selecting one from a set of values configured via RRC signaling.

20. The non-transitory memory element of claim 18, wherein a value of the specified number is determined to create a gap that is required to perform an RF retuning operation for the device when the gap between a central frequency of the PRACH occasion and a central frequency of an associated CORESET is larger than a maximum BW supported by the device.

* * * * *